This invention relates to improvements in fuel cells for the conversion of chemical energy to electrical energy by electrochemical oxidation of a fluid, combustible fuel. In particular, this invention relates to an improved method of operating a fuel cell employing at least two acids in the electrolyte, and to a novel combination of cathode and catholyte. More particularly, this invention relates to the use of nitric acid in combination with sulfuric acid and/or phosphoric acid as a fuel cell catholyte.

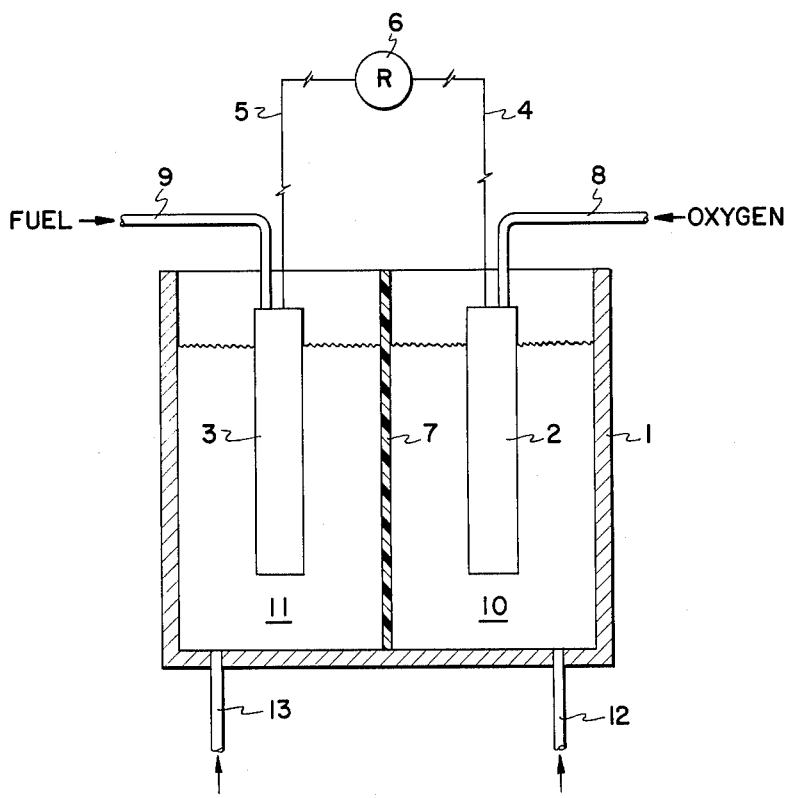
Joseph A. Shropshire
Barry L. Tarmy  INVENTORS
BY *Olin B. Johnson*
PATENT ATTORNEY 3,261,717
PROCESS OF OPERATING A FUEL CELL CONTAINING INORGANIC ACID ELECTROLYTE
Joseph A. Shropshire, Scotch Plains, and Barry L. Tarmy, Berkeley Heights, N.J., assignors to Esso Research and Engineering Company, a corporation of Delaware
Filed Dec. 19, 1961, Ser. No. 160,570
3 Claims. (Cl. 136—86)

Fuel cells employing acid electrolytes are known in the art. The term "fuel cell" is used herein to refer to a device, apparatus or system wherein hydrogen or a fluid organic compound of lower oxidation state than carbon dioxide is oxidized electrochemically with resulting net production of electrical energy. The fuels suitable for use in these cells are well known in the art and need not be dealt with exhaustively here. In general, the preferred fuels have been the hydrogen comprising fuels, i.e., hydrogen and organic compounds containing hydrogen in their molecular structure, e.g. $C_1$–$C_{12}$ hydrocarbons and oxygen substituted hydrocarbons having a significant solubility in the electrolyte employed. Especially preferred fuels include $C_2$–$C_5$ olefins, $C_1$–$C_5$ alcohols, $C_2$–$C_3$ glycols, and hydrogen.

Higher molecular weight organic compounds may also be used employing techniques known in the art. These include hydrocarbons and substituted hydrocarbons of carbon, hydrogen and oxygen which may include other substituents. In the case of higher molecular weight fuels, one may employ elevated temperatures, mutual solvents and other techniques known in the art to increase fluidity, solubility, and reactivity.

The use of nitric acid as the catholyte of a fuel cell is known in the art. In cells of this type heretofore disclosed, an anolyte of sulfuric acid is separated from the catholyte by an ion-permeable membrane and a relatively high concentration of nitric acid is required in the catholyte. Thus, in British Patent 844,584, it is stated that the strength of the nitric acid in the catholyte can vary from 2 to 10 normal, i.e. about 12 to 48.5 wt. percent.

The overall fuel cell reaction is the sum of two essentially independent half-cell reactions. At the anode hydrogen or a hydrogen-containing liquid or gas is electrochemically oxidized with a release of electrons to the anode while an oxidant is reduced at the cathode with an acceptance of electrons. The electrical circuit is completed by ion transfer between electrodes through the electrolyte and electron transfer between electrodes by conductors positioned outside such electrolyte. Such cells may be electrically connected in series and/or parallel. An effective fuel cell is, therefore, dependent upon the effective operation of both cathodic and anodic half-cells.

At the present level of technological development, a fuel cell cannot be effectively operated with high concentrations of nitric acid or of the $-NO_3$ ion in contact with the anode or fuel electrode.

Although the cathodic half-cell reaction functions well with nitric acid in contact with the cathode, the same acid adversely affects the anodic half-cell reaction. Thus, when nitric acid is employed in the anolyte in concentrations heretofore suggested for use in the catholyte the electrical energy generated in the cell is reduced to insignificance or completely extinguished. By dividing the electrolyte compartment into anolyte and catholyte sub-compartments with one of the various ion-permeable partitions known to the art, a general intermingling of two aqueous acid solutions can be retarded but ultimately an equilibrium will be reached. Furthermore, the higher the concentration of nitric acid in the catholyte, the sooner the tolerable limit in the anolyte will be reached through diffusion.

It is, therefore, one object of this invention to provide a method for operating a fuel cell over extended periods with an effective nitric acid concentration, or nitrate ion equivalent thereof, in the catholyte while maintaining the concentration of the same below tolerable limits in the anolyte.

It is another object of this invention to provide an effective method for operating a fuel cell wherein oxygen gas, either by itself or in admixture with other gases such as air, is admitted directly to the catholyte without first passing into or through the cathode, thus avoiding the limitations inherent in the employment of a gas diffusion cathode.

In accordance with this invention, a mineral acid, preferably sulfuric acid, catholyte is admixed with nitric acid. The catholyte contains about 1 to 6, preferably 1 to 3, and more preferably about 1 to 2 wt. percent $HNO_3$, or an equivalent concentration of $-NO_3$ ion. The nitric acid may be employed with electrolytes having $H_2SO_4$ concentration heretofore employed in single acid electrolytes. These usually contain about 3 to 50 wt. percent sulfuric acid with low concentrations in the range of about 3 to 10 wt. percent preferred in certain embodiments employing certain specific fuels and operating conditions while those of higher concentrations usually in the range of about 20 to 40 wt. percent are preferred for other embodiments employing other fuels or other conditions. The addition of $HNO_3$ is particularly effective with $H_2SO_4$ concentrations in the range of about 25 to 35 wt. percent. Acid resistant electrode materials suitable for use in sulfuric acid may be used with the mixed electrolytes of this invention.

In accordance with a preferred embodiment of this invention, the anolyte is prepared by admixing water, nitric acid and sulfuric acid in the proportions aforestated. The electrolyte compartment is divided into an anolyte zone and a catholyte zone by ion permeable partition such as an ion exchange membrane or one of the many other suitable semi-permeable dividers known to the art. The anolyte zone is charged with aqueous sulfuric acid of essentially the same concentration as the catholyte.

Partitions suitable for this use are well known in the art and do not, as such, constitute a part of this invention. Membranes that have been used for this purpose include ion-exchange resin membranes and interpolymer membranes.

Ion-exchange resin membranes, i.e. organic membranes at least one component of which is a polyelectrolyte, are well known in the art. Such membranes include in their polymeric structure dissociable ionizable radicals at least one ionic component of which is fixed to or retained by a polymeric matrix with at least one ion component being a mobile and replaceable ion electrostatically associated with the first component. The ability of the mobile ion to be replaced under appropriate conditions by other ions imparts ion-exchange characteristics to these materials.

An interpolymer membrane is one which is cast from a solution containing both a polymeric electrolyte or ionogenic material and a matrix polymer so as to form a film composed of these two intermeshed molecular species. A typical interpolymer membrane is made by dissolving linear polystyrene sulfonic acid and acrylonitrile is N,N- dimethylformamide, casting the solution as a film and evaporating off the solvent.

The $H_2SO_4$—$HNO_3$ combination provides a catholyte mixture that is superior to sulfuric acid alone and because of the limited $HNO_3$ content, a cell having this catholyte and a sulfuric acid anolyte can be operated over extended periods of time without $HNO_3$ migration into the anolyte exceeding tolerable limits. Fuel cells are normally purged of electrolyte periodically, cleaned and supplied with fresh electrolyte. In accordance with this invention, the $HNO_3$ content of the anolyte is maintained below about 1 wt. percent and preferably below about 0.9 wt. percent. In accordance with this invention, the anolyte is drained and replaced upon the $HNO_3$ concentration approaching a predetermined limit.

In one embodiment, control is effected by having the anolyte purged and fresh $H_2SO_4$ anolyte supplied upon the current density developed falling below a predetermined level. This can be effected manually or, with cells in continuous operation, this can be effected automatically, e.g. by a solenoid valve system connected with the anolyte compartment and controlled by the rate of flow of electric current from the cell.

In another embodiment, an anolyte zone having a capacity in excess of the catholyte zone is employed to increase dilution of $HNO_3$ escaping into the anolyte.

It is also within the scope of this invention to continuously or intermittently remove the anolyte from the cell while continuously or intermittently supplying fresh anolyte to the anolyte zone.

In the operation of the cell, the nitric acid content of the mixed acid catholyte is reduced at the cathode to an oxide of nitrogen such as NO and/or $NO_2$ and the continuous introduction of oxygen gas to the catholyte serves to regenerate the reduction products by reforming nitric acid and perpetuating the reaction. Where loss of nitric acid occurs over a period of time, the desired concentration of such acid in the catholyte is maintained by periodic additions of $HNO_3$.

The number of times that the regeneration of nitric acid can be effected before replacement is necessary will vary somewhat with the cell design and with the composition and construction of the cathode.

It is within the scope of this invention to carry out the cell operation employing a conventional gas diffusion cathode of suitable acid resistant material to introduce the oxygen gas to the electrolyte. However, the electrolyte of this invention makes feasible a method of novel operation wherein the continuous supply of oxygen gas, either as pure oxygen or admixed as in air, is introduced directly into the electrolyte before or without contacting the cathode. This eliminates the many problems and limitations inherent in the use of "gas diffusion electrodes." In the past it has been possible to successfully employ a fuel electrode or anode which was no more complicated in construction than a simple sheet of metal surfaced with the desired catalyst. Anodes of this type have been used with anolyte soluble fuels, e.g. methyl alcohol. However, the design of the cathode has been limited in cells receiving a continuous flow of oxygen gas by the necessity for three phase contact between such gaseous oxidant, the liquid electrolyte and the solid conductor or cathode. The terms "gas diffusion electrode" and "non-diffusion electrode" have acquired a meaning in the art and are employed in accordance with such meaning. Basically the meaning of the terms is concerned with the manner in which they are employed although certain types of electrode structures have become identified with one or the other of such terms. An electrode functions as a diffusion electrode when a reactant gas, i.e. fuel or oxidant as the case may be, passes into, through or along a surface of the electrode before contacting the liquid electrolyte. An electrode functions as a non-diffusion electrode when the half-cell reaction involved is carried out with the reactant passing directly into the electrolyte without first contacting the electrode.

The most common type of electrode structure utilized as a diffusion electrode is the porous electrode of carbon or suitable metal. These may take the form of a unit comprising two or more plates of different porosity or a single structure of the so-called "dual porosity" type wherein relatively large pores containing gas and relatively small pores containing liquid electrolyte meet or intersect within a conductive material.

In the electrolyte mixture herein employed there is no necessity for the oxygen gas admitted to the electrolyte to contact the cathode since the oxygen is primarily employed to regenerate reduction products of the nitric acid in the electrolyte.

With the mixed acid catholytes employed in this invention, the use of the non-diffusion type electrode can be extended to the cathode. With this advantage, the requisite over-all cell design becomes much more flexible.

This electrolyte is prepared by mixing the proper amounts of each acid, or, in the alternative the equivalent amount of a suitable salt which releases the $-NO_3$ ion in aqueous solution, e.g. $NaNO_3$.

Cells employing the mixed electrolyte of this invention are preferably operated at temperatures about about 130° F. and below the boiling point of the electrolyte at the pressure employed, e.g. 130° to about 200° F. when operating at atmospheric pressure.

Nitric acid is also compatible with aqueous phosphoric acid electrolytes and the improvements achievable over the use of phosphoric acid alone is comparable to the improvement with the aforedescribed embodiment. Generally higher weight concentrations of the primary electrolyte are employed when $H_3PO_4$ constitutes such primary electrolyte than when $H_2SO_4$ is used.

Referring now to the accompanying drawing which schematically illustrates a simple fuel cell which may be used for carrying out this invention, shown in the drawing are a vessel 1, a cathode 2 and an anode 3. Cathode 2 and anode 3 are electrically connected by wires 4 and 5 and resistance means 6 which may be any device for utilizing electric current or merely an extension of wires 4 and 5. Vessel 1 of glass, ceramic, polypropylene, hard rubber, metal or other suitable material forms an electrolyte compartment and is here shown uncovered although in practical employment such cells would ordinarily be covered. Cathode 2 and anode 3 may be a hollow, porous cylinder, metal sheets or grids, metal surfaced nonconductors, or, in other embodiments may take the form of a porous carbon plate where the electrode is built into the wall forming the electrolyte compartment. The carbon electrodes may be impregnated with a suitable metal catalyst. The anode catalyst is preferably a noble metal of Group VIII of the Periodic Table that is chemically resistant to the electrolyte, or mixtures of such metals with each other or with gold. The cathode catalyst may be the same or different and here gold is most preferred. If metal plates or grids are employed it is preferred to completely surface the electrode with one or more of these same metals. Other metals heretofore successfully employed in fuel cells utilizing a mineral acid electrolyte may also be used. The electrolyte compartment formed by vessel 1 is here divided by an ion-permeable membrane 7, e.g. an ion-exchange resin membrane, into a catholyte compartment 10 and an anolyte compartment 11. Membrane 7 is optional equipment.

When cathode 2 and anode 3 are porous carbon cylinders, a fluid oxidant, e.g. oxygen gas, is admitted to the interior of cathode 2 via conduit 8 and a fluid fuel, e.g. hydrogen is admitted to the interior of anode 3 via conduit 9. When cathode 2 and anode 3 are metal sheets or metal grids a fluid oxidant, e.g. air, is admitted to the catholyte compartment via conduit 12 and a soluble or absorbable fluid fuel, e.g. methyl alcohol or butene-1, is admitted to anolyte compartment 11 via conduit 13.

This invention will be more fully understood from the following examples:

Example 1

A fuel cell is operated in accordance with this invention at atmospheric pressure and 180° F. with the electrolyte compartment divided into an anolyte compartment and a catholyte compartment by a partition comprising a sintered glass frit. The aqueous catholyte prepared by mixing water, $H_2SO_4$ and $HNO_3$ in proportions such that the $H_2SO_4$ accounts for 25 wt. percent and the $HNO_3$ 6 wt. percent of the total catholyte is placed in the catholyte compartment; the aqueous anolyte, prepared by mixing water and $H_2SO_4$ in proportions such that the $H_2SO_4$ accounts for 30 wt. percent of the total anolyte, is admitted into the anolyte compartment.

The electrodes employed in both the anolyte and catholyte compartments are platinum black surfaced platinum sheets. These are connected by a copper wire external to both anolyte and catholyte. Butene-2 is continuously admitted to the anolyte and oxygen gas is bubbled through the catholyte and current is drawn from the cell.

The same cell is operated as before except that an aqueous electrolyte containing nitric acid in a 2 normal concentration is employed as the catholyte. The cell is operated until the limits of tolerability of nitric acid in the anolyte is exceeded and the electrochemical activity and hence current density of the cell reduced to insignificance. At an equal period of operation, the cell employing the mixed catholyte is still operating with an effective current density and the nitric acid content of the anolyte still substantially below the tolerable limit. Later upon this anolyte reaching a nitric acid content of 0.9 wt. percent, the anolyte is replaced with 30 wt. percent aqueous $H_2SO_4$.

Example 2

The effect of $HNO_3$ concentration upon the performance of each half-cell was tested by varying the $HNO_3$ content of an aqueous sulfuric acid electrolyte wherein the total acid concentration, i.e. $HNO_3+H_2SO_4$, was 30 wt. percent in each run. The electrodes were platinum and gold impregnated porous carbon which had been wetproofed by the deposition of polytetrafluoroethylene upon the surfaces of the larger pores. The electrolyte temperature was 180° F. The oxidant was oxygen gas at one atmosphere. The results obtained in comparing various $HNO_3$ concentrations are set forth in the following table:

Example 3

Methanol was substituted for hydrogen as the fuel and the procedure of the previous example followed. Anodic polarization with 0.1 wt. percent $HNO_3$ compared favorably with the equivalent hydrogen run.

Example 4

Cells were operated with 1 to 6 wt. percent $HNO_3$ in 25–35 wt. percent $H_2SO_4$ aqueous catholytes to test various electrodes. Successfully employed as cathodes in contact with the mixed acids were porous carbon, platinum impregnated carbon, gold surfaced metal strips, and platinum surfaced metal strips.

Example 5

A cell was operated with an $H_3PO_4$—$HNO_3$ mixed catholyte in lieu of the $H_2SO_4$—$HNO_3$ catholyte previously employed. The cathode was platinum and gold impregnated carbon, the larger pores of which had been wetproofed with polytetrafluoroethylene. The concentration of the catholyte acids were, respectively, 50 wt. percent $H_3PO_4$ and 1 wt. percent $HNO_3$. The temperature of the electrolyte was 180° F. The polarizations measured for the cathodic half-cell are set forth in the following table:

TABLE II.—POLARIZATION OF CATHODE IN $H_3PO_4$—$HNO_3$

|  | Volts, Polarization from Theoretical Oxygen at amps./ft.² as Indicated | | | |
| --- | --- | --- | --- | --- |
|  | 0 | 10 | 30 | 50 |
| 50% $H_3PO_4$–1% $HNO_3$ | 0.10 | 0.15 | 0.20 | 0.23 |

The terms "mixture" and "acid mixture" are used herein to refer to any intermingling of two or more acids including mixed solutions.

What is claimed is:

1. A process of operating a fuel cell comprising an anode, a cathode, an anolyte compartment, a catholyte compartment, an ion permeable partition separating said anolyte compartment and said catholyte compartment, an aqueous mineral acid anolyte selected from the group consisting of 3 to 50 wt. percent sulfuric acid and phos- TABLE I.—EFFECT OF $HNO_3$ CONCENTRATION IN $H_2SO_4$-$HNO_3$ ELECTROLYTE $H_2$-ANODE AND $O_2$ CATHODE PERFORMANCE

| Percent $HNO_3$ in 29–30% $H_2SO_4$ | (1) Volts Polarization (Loss) From Respective Theory at 10 and 30 amps./ft.² | | | | | |
| --- | --- | --- | --- | --- | --- | --- |
|  | 10 | | | 30 | | |
|  | $H_2$ | $O_2$ | Combined Loss | $H_2$ | $O_2$ | Combined Loss |
| 0.0 | 0.19 | 0.38 | 0.57 | 0.32 | 0.53 | 0.85 |
| 0.1 | 0.19 | 0.28 | 0.47 | 0.32 | 0.51 | 0.83 |
| 0.2 | 0.18 | 0.20 | 0.38 | -------- | -------- | -------- |
| 0.4 | 0.18 | 0.15 | 0.33 | 0.30 | 0.35 | 0.65 |
| 0.5 | 0.18 | 0.14 | 0.32 | 0.30 | 0.31 | 0.61 |
| 0.65 | 0.18 | 0.13 | 0.31 | 0.34 | 0.19 | 0.53 |
| 0.80 | 0.18 | 0.13 | 0.31 | 0.33 | 0.20 | 0.53 |
| 0.90 | 0.18 | 0.13 | 0.31 | 0.34 | 0.19– | 0.53 |
| 1.0 | 0.18 | 0.11 | 0.29 | 0.56 | 0.18 | 0.74 |
| 2.0 | 0.34 | 0.11 | 0.45 | >1.20 | -------- | -------- |

(1) The term "polarization" wherever employed in this specification refers to the difference between observed voltage and the voltage of a reversible electrode operating with the same reactant, temperature, pressure, and electrolyte. It does not refer to the difference between observed voltage and open circuit voltage (rest potential). Theoretical potential (at 180° F., 1 atmosphere, and 30 wt. percent $H_2SO_4$) for the oxygen electrode is 1.21 volts and for the hydrogen electrode 0.01 volt below (negative to) Standard Hydrogen Reference.

phoric acid, a catholyte consisting essentially of about 1 to 6 wt. percent $HNO_3$ and an aqueous mineral acid selected from the group consisting of about 3 to 50 wt. percent sulfuric acid and phosphoric acid, comprising passing a fluid fuel into dual contact with said anolyte and said anode, passing a fluid oxidant into said catholyte compartment, and establishing electrical connection between said anode and said cathode exterior to said anolyte and said catholyte.

2. A process of operating a fuel cell in accordance with claim 1 wherein the sulfuric acid concentration in said catholyte is 25 to 35 wt. percent.

3. A process as defined by claim 1 wherein oxygen gas as said fluid oxidant is passed through said catholyte prior to said oxygen gas contacting said cathode.

References Cited by the Examiner

UNITED STATES PATENTS

| | | | |
|---|---|---|---|
| 2,901,522 | 8/1959 | Bopp | 138—86 X |
| 3,082,282 | 3/1963 | Gruneberg et al. | 136—86 |

FOREIGN PATENTS

| | | |
|---|---|---|
| 844,584 | 8/1960 | Great Britain. |

OTHER REFERENCES

Status Report on Fuel Cells, 1959, pages 20, 60–64.

WINSTON A. DOUGLAS, *Primary Examiner.*

JOHN R. SPECK, *Examiner.*

H. FEELEY, A. B. CURTIS, *Assistant Examiners.*